US012449982B2

(12) United States Patent
Zhou et al.

(10) Patent No.: US 12,449,982 B2
(45) Date of Patent: Oct. 21, 2025

(54) PAGE OFFLINING BASED ON FAULT-AWARE PREDICTION OF IMMINENT MEMORY ERROR

(71) Applicant: Intel Corporation, Santa Clara, CA (US)

(72) Inventors: Shen Zhou, Shanghai (CN); Xiaoming Du, Shanghai (CN); Cong Li, Shanghai (CN); Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 821 days.

(21) Appl. No.: 17/512,432

(22) Filed: Oct. 27, 2021

(65) Prior Publication Data

US 2022/0050603 A1     Feb. 17, 2022

(51) Int. Cl.
*G06F 3/00* (2006.01)
*G06F 3/06* (2006.01)

(52) U.S. Cl.
CPC .......... *G06F 3/0619* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,409,594 B2 | 8/2008 | Mukherjee et al. | |
| 10,705,901 B2 | 7/2020 | Shah et al. | |
| 2007/0088974 A1 | 4/2007 | Chandwani et al. | |
| 2009/0164872 A1 | 6/2009 | Chessin et al. | |
| 2009/0271676 A1 | 10/2009 | Biswas et al. | |
| 2016/0148707 A1 | 5/2016 | Yazdanbakhsh et al. | |
| 2019/0129777 A1 | 5/2019 | Rangarajan | |
| 2019/0266036 A1 | 8/2019 | Franco et al. | |
| 2019/0266037 A1 | 8/2019 | Shah et al. | |
| 2019/0348143 A1* | 11/2019 | Zeng | G06F 11/1048 |
| 2021/0279122 A1 | 9/2021 | Zhou et al. | |
| 2023/0251930 A1* | 8/2023 | Nemati | G06F 11/1048 |
| | | | 714/764 |

OTHER PUBLICATIONS

Costa Carlos Ha et al: "A System Software Approach to Proactive Memory-Error Avoidance", SC14: International Conference for High Performance Computing, Networking, Storage and Analysis, IEEE, Nov. 16, 2014 (Nov. 16, 2014), pp. 707-718.

(Continued)

*Primary Examiner* — Midys Rojas
(74) *Attorney, Agent, or Firm* — Compass IP Law PC

(57) ABSTRACT

A system can predict what pages of memory the system should offline based on identification of how correctable error patterns correlate to the memory architecture. The failure prediction can account for the circuit-level architecture of the memory rather than the mere number or frequency of correctable errors. A controller correlates the hardware configuration of the memory with historical error data, and generates an estimate of pages for a host operating system (OS) to offline based on predicting uncorrectable errors (UEs).

21 Claims, 9 Drawing Sheets

(56) References Cited

OTHER PUBLICATIONS

Du Xiaoming et al: "Predicting Uncorrectable Memory Errors for Proactive Replacement: An Empirical Study on Large-Scale Field Data", 2020 16TH European Dependable Computing Conference (EDCC), IEEE, Conference (EDCC), Sep. 7, 2020 (Sep. 7, 2020), pp. 41-46.
Du Xiaoming Xiaoming Du@Intel Com et al: "Combining error statistics with failure prediction in memory page offlining", Proceedings of the International Symposium On Memory Systems, Memsys '19, ACM Press, New York, New York, USA, Sep. 30, 2019 (Sep. 30, 2019), pp. 1-7.
Extended European Search Report for Patent Application No. 22188954.6, Mailed Feb. 1, 2023, 10 pages.
Xiaoming Du et al: "Memory failure prediction using online learning", Memory Systems, ACM, 2 Penn Plaza, Suite 701 New York NY 10121-0701USA, Oct. 1, 2018 (Oct. 1, 2018), pp. 38-49.

* cited by examiner

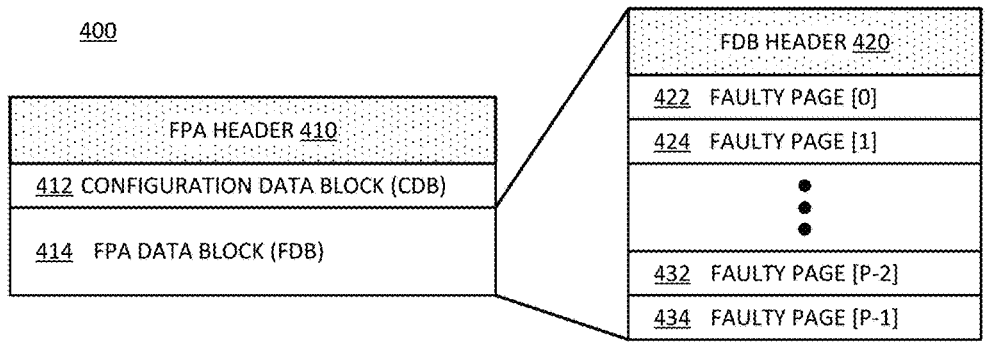
FIG. 4
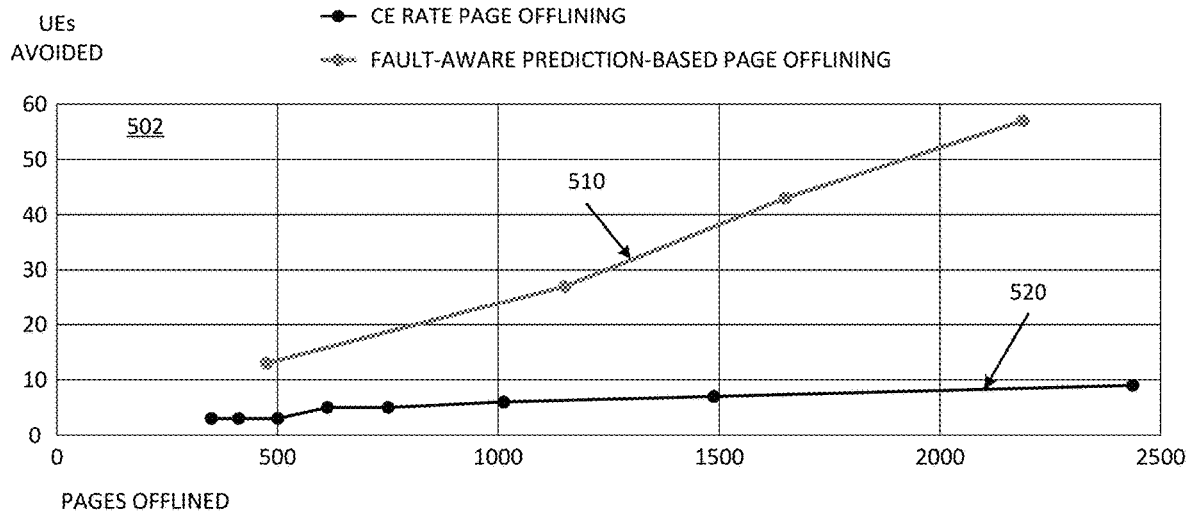
FIG. 5A
| 504 | | UEs AVOIDED | PAGES OFFLINED |
|---|---|---|---|
| 532 | TRADITIONAL (WINDOWS) | 3 | 499 |
| 534 | FAULTY PAGE PREDICTION - 20 | 13 | 480 |
| 536 | TRADITIONAL (LINUX) | 6 | 1005 |
| 538 | FAULTY PAGE PREDICTION - 15 | 27 | 1152 |
| 540 | TRADITIONAL (AGGRESSIVE) | 9 | 2437 |
| 542 | FAULTY PAGE PREDICTION - 5 | 57 | 2184 |
FIG. 5B

PAGE OFFLINING BASED ON FAULT-AWARE PREDICTION OF IMMINENT MEMORY ERROR

CROSS-REFERENCE TO RELATED APPLICATIONS

This application claims the benefit of priority to Patent Cooperation Treaty (PCT) Application No. PCT/CN2021/119543 filed Sep. 22, 2021. The entire content of that application is incorporated by reference.

FIELD

Descriptions are generally related to memory systems, and more particular descriptions are related to page offlining based on prediction of uncorrectable errors.

BACKGROUND

Memory failure is among the leading causes of server failure and associated downtime in datacenters. Memory errors can be classified as correctable error (CE) or uncorrectable error (UE). CEs refer to transient errors within the memory device data that can be corrected with the application of error checking and correction (ECC). UEs refer to errors that cannot reasonably be corrected with the application of ECC, and result in system failure.

There are systems that attempt to predict memory failure to reduce unplanned system downtime. One strategy for memory failure prediction can be predictive memory page offlining, which provides the capability for the operating system (OS) to offline a specific page when an error condition is satisfied.

Traditional fault prediction is threshold-based counting of correctable errors (CEs), triggering page offlining in response to a page level CE threshold. When the number of errors of a page in specific time window (usually 24 hours) exceeds a preconfigured threshold, the page is offlined. However, traditional correctable error statistics, even if coupled with historical information about CEs, do not provide reliable UE prediction in memory systems. Thus, relying on CE thresholds does not provide a reliable basis for page offlining.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 4 is a table illustrating an example of a layout of faulty page address.

FIG. 5A is a diagrammatic representation of an example of faulty page prediction.

FIG. 5B is a table of an example of faulty page prediction values for the graph of FIG. 5A.

Descriptions of certain details and implementations follow, including non-limiting descriptions of the figures, which may depict some or all examples, and well as other potential implementations.

DETAILED DESCRIPTION

As described herein, a system can predict what pages of memory the system should offline based on identification of how correctable error patterns correlate to the memory architecture. The failure prediction can account for the circuit-level architecture of the memory rather than the mere number or frequency of correctable errors. Observation of error patterns related to circuit structure is a much more reliable indicator of likelihood of page fault than simply monitoring total CE count. Thus, prediction of pages to offline based on circuit-level information provides more reliable prediction and improved system performance.

In one example, memory device fault prediction is provided based on correctable error information correlated with system architecture information. Thus, the system can account for rank, bank, row, column, or other information related to the physical organization and structure of the memory in predicting uncorrectable errors. It can be observed that uncorrectable errors (UEs) tend to be strongly correlated with faults at the column, row, or bit level, which is not informed by a total correctable error (CE) count. A controller correlates the hardware configuration of the memory with historical error data, and generates an estimate of pages for a host operating system (OS) to offline based on predicting uncorrectable errors (UEs).

Traditional counting of total errors is fault-agnostic, whereas prediction based on the hardware configuration can be based on observation of the underlying hardware faults. Some faults, e.g., a row (wordline) fault, a column (bitline or DQ (data I/O (input/output))) fault, are associated with multiple pages. Observing CEs in an individual page cannot reflect the faulty status of the row or column. Furthermore, for example, a row fault is more appropriately mitigated with page offlining than a column fault, since fewer pages will be affected. Thus, knowing details of the underlying fault can allow the system to make better prediction of which rows to offline. Simply counting CEs over time is very imprecise at predicting a subsequent UE. A fault-aware system can make predictions based on awareness of the faults, allowing it to better identify pages for offlining to avoid future UEs.

Figure 1:
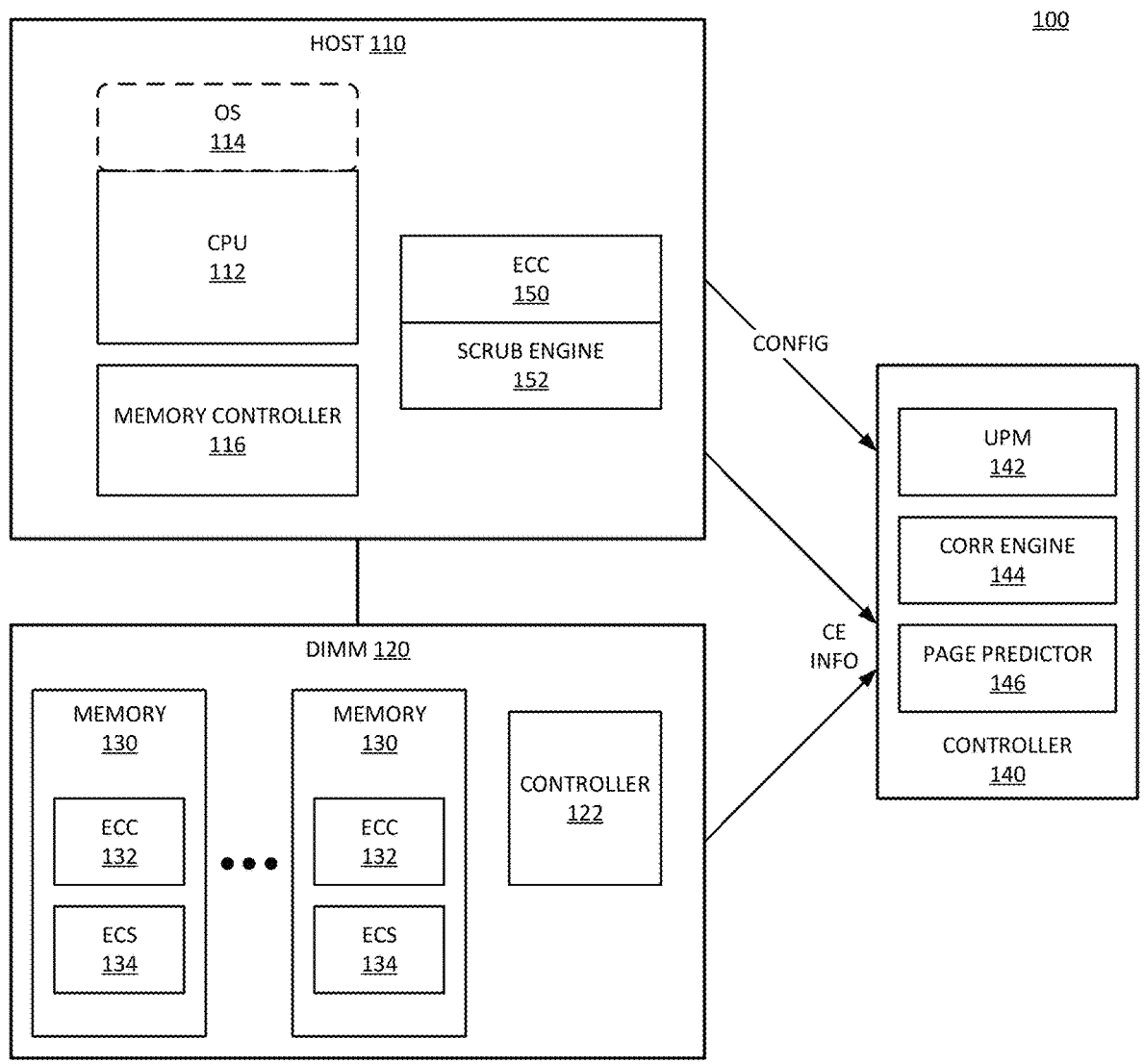
FIG. 1 is a block diagram of an example of a system with faulty page prediction.

FIG. 1 is a block diagram of an example of a system with faulty page prediction. System 100 illustrates memory coupled to a host. Host 110 represents a host computing platform, such as an SOC (system on a chip). Host 110 includes host processing elements (e.g., processor cores) represented by CPU (central processing unit) 112 and memory controller 116. Host 110 includes hardware interconnects and driver/receiver hardware to provide the interconnection between host 110 and DIMM (dual inline memory module) 120.

DIMM 120 includes memory 130, which represents parallel memory resources coupled to host 110. Memory 130 represents the multiple memory devices of DIMM 120. Memory controller 116 manages access to memory 130. DIMM 120 includes controller 122, which represent control logic of DIMM 120. In one example, controller 122 is, or is part of, control logic that manages the transfer of commands and data on DIMM 120. For example, controller 122 can be part of a registering clock driver (RCD) or other control logic on DIMM 120. In one example, controller 122 is a separate controller from an RCD.

In one example, memory 130 includes ECC (error checking and correction) 132, which represents on-die ECC, or logic on the memory device to perform error correction for data exchange with host 110. In one example, memory 130 includes ECS (error checking and scrubbing) 134. ECS 134 represents logic on-die on memory 130 to perform periodic error scrubbing of data stored on the memory and can be referred to as a scrubbing engine. Error scrubbing refers to detecting errors, correcting the errors, and writing the corrected data back to the memory array. In one example, memory 130 can detect errors in memory based on ECC 132 and ECS 134.

Host 110 includes ECC 150, which can be part of memory controller 116. In one example, host 110 includes scrub engine 152, which can also be part of memory controller 116. Whereas ECS 134 represents a scrubbing engine on-memory, system 100 can include scrub engine 152 to enable memory controller 116 to perform patrol scrubbing. In one example, scrub engine 152 can detect and report errors detected in memory 130.

Memory controller 116 performs system-level ECC on data from multiple memory devices 130 in parallel, while ECC 132 performs ECC for a single device based on local data. On-die ECC 132 or ECC logic on controller 122 can enable error correction prior to sending data to host 110. In one example, ECS 134 uses ECC 132 to perform error scrubbing. Memory controller 116 can utilize ECC 150 to perform system-level ECC on the data, and the operation of ECC 150 is separate from ECC 132.

ECS 134 or scrub engine 152 can perform patrol scrubbing, which refers to performance of error checking and scrubbing of all memory 130 within a set period, such as scrubbing the entire memory every 24 hours. ECS 134 or scrub engine 152 can generate CE and UE information during the scrub to indicate correctable errors and hard faults or uncorrectable errors detected in memory 130. Such information can be referred to as a historical error information. When a scrubbing engine detects an error in data of memory 130, in one example, the scrubbing engine provides information to memory controller 116, which can record the data to use for prediction.

In one example, system 100 includes controller 140. In one example, controller 140 is part of controller hardware of a hardware platform of system 100. For example, controller 140 can be part of the system board chipset, such as the control circuitry of a system board or motherboard. In one example, controller 140 is part of controller 122. In one example, controller 140 is part of memory controller 116. Controller 140 provides faulty page prediction.

In one example, controller 140 represents a faulty page prediction engine implemented in a microcontroller on a system board. In one example, the microcontroller is a dedicated controller for error management. In one example, the microcontroller is part of system board control hardware, and controller 140 can be implemented as firmware on the microcontroller. Thus, a microcontroller that executes controller 140 can also perform other operations.

In one example, controller 140 includes UPM (uncorrectable error prediction model) 142 and correlation (CORR) engine 144. UPM 142 can represent a model of expected error conditions based on patterns of correctable errors detected in memory data. UPM 142 can be referred to as a failure prediction model for the memory. The patterns of correctable errors refer specifically to patterns of errors based on patterns of errors with respect to hardware or memory architecture. Correlation engine 144 can correlate detected errors in the data with hardware configuration information to identify patterns that are indicative of a high likelihood of imminent uncorrectable error. Correlation engine 144 can correlate historical error information, both recently detected errors and patterns of errors (e.g., based on UPM 142).

In one example, host 110 provides configuration information (CONFIG) to controller 140 to indicate hardware information. In addition to memory hardware information, in one example, the configuration information can include information about the processor, operating system, peripheral features and peripheral controls, or other system configuration information. In one example, memory 130 provide correctable error information (CE INFO) to controller 140 to indicate detection of CEs, to indicate when and where CEs have occurred. In one example, host 110 provides CE INFO to controller 140 to indicate detection of CEs in memory 130. In one example, correlation engine 144 correlates the CE information, including information about when and where errors have occurred within the memory structure, with configuration information, such as memory configuration and system platform configuration.

In one example, UPM 142 represents CE historical information. Thus, system 100 can apply CE history in predicting failures, and apply the CE historical information in predicting which pages to offline. In one example, the historical information can be of a similar granularity as the information (CE INFO) gathered by controller 140, identifying hardware-level information that can be correlated with detected CEs.

In one example, controller 140 correlates detected errors with hardware configuration information for DIMM 120 and memory 130. Such information can be referred to as the memory hardware configuration. In one example, controller 140 correlated detected errors with hardware configuration information for the computer system, which can include memory hardware configuration as well as hardware, software, and firmware configuration of one or more components of the system board or the host hardware platform. The host hardware platform can refer to the configuration of the host processor and other hardware components that enable operation of the computer system. The software or firmware configuration of a system can be included with hardware configuration information to the extent that the software configuration of the hardware causes the same hardware to operate in different ways.

Controller 140 can apply correlation engine 144 to correlate CE information with configuration information. In one example, correlation engine 144 accounts for historical CE and hardware configuration information based on models stored in UPM 142. In one example, CE information is generated by ECS 134 or scrub engine 152, or both ECS 134 and scrub engine 152, and provided to controller 140 for prediction of pages to offline.

Host 110 includes OS (operating system) 114, which executes on CPU 112. OS 114 represents a software platform for system 100. Software programs and processes can execute under OS 114. OS 114 manages memory for software programs that execute on CPU 112. In one example, OS 114 keeps track of memory pages that are available for use by software programs. OS 114 can offline memory pages to prevent their use by software programs.

Page offlining means that OS 114 stops using a page of memory (typically 4K of size) to avoid potential memory errors introduced in the page. A physical page is mapped to a subset of a row in the memory device. The effectiveness of page offlining depends highly on underly faults of the memory. For example, a column (bitline or DQ) fault is not appropriate for page offlining, since there are too many pages associated with the column (e.g., 65536 pages in 16 GB DIMMs).

In one example, controller 140 includes page predictor 146. Page predictor 146 represents the ability of controller 140 to generate a prediction of pages to offline to avoid uncorrectable errors. Page predictor 146 generates an estimate of pages for OS 114 to offline based on the underlying faults in memory 130. System 100, through controller 140, can predict uncorrectable errors in memory 130. Page predictor 146 can determine how the UEs would affect different physical pages of memory, and indicate to OS 114 an estimate of which pages should be offlined.

Page predictor 146 can identify pages as potential failure pages based on identification of correctable error patterns based on the memory architecture. The failure prediction can thus account for the circuit-level of the memory rather than the mere number or frequency of correctable errors. Thus, the system can predict uncorrectable memory errors or uncorrectable errors (UEs) by evaluating microlevel CE information, and identify pages that are good candidates to offline based on the microlevel information. The microlevel information can be error information at the level of bit or DQ (data interface to the data bus), row, column, device, rank, or other information.

In one example, page predictor correlates historical fault information with microlevel architecture information. Rather than looking at the number of CEs within a page, page predictor 146 can look at patterns of CEs on the specific level of the hardware architecture. Controller 140 can generate microlevel fault indicators, and page predictor 146 can determine if page is a candidate for offlining based on the microlevel fault indicators.

Page predictor 146 looks at bit error patterns in making faulty page predictions. In one example, page predictor 146 compares error prediction information to ECC patterns. In one example, controller 140 understands how ECC 150 applies error correction in system 100. Based on the ECC patterns or how ECC is applied at host 110, page predictor 146 can determine if a fault is fully correctable by ECC or partially correctable by ECC. If a fault is fully correctable, it is not likely to generate a UE. If the fault is only partially correctable, the fault may be prone to causing a UE, which makes the fault a good candidate for offlining a page.

With page predictor 146, controller 140 can be a faulty page predictor engine. Controller 140 can provide a fault-aware prediction-guided policy for indication of faulty pages to the OS to offline. Controller 140 can provide platform telemetry of fault pages to indicate the faulty pages to OS 114 to enable the OS to perform effective memory page offlining. Correlation engine 144 enables page predictor 146 to examine precise UE predictors to determine whether the faults are likely to lead to UEs. Page predictor 146 can identify the pages associated with faults and notify OS 114 for page offlining.

With controller 140, system 100 can have improved server platform reliability by predicting imminent memory failures and taking action to sidestep failures before they happen. As described below with reference to FIG. 5A, a system in accordance with system 100 can have a much lower UE occurrence with similar number of pages offlined as compared to traditional offlining policies. Thus, a system in accordance with system 100 can have improved RAS (reliability, availability, serviceability) relative a system that applies a traditional offlining policy.

Figure 2A:
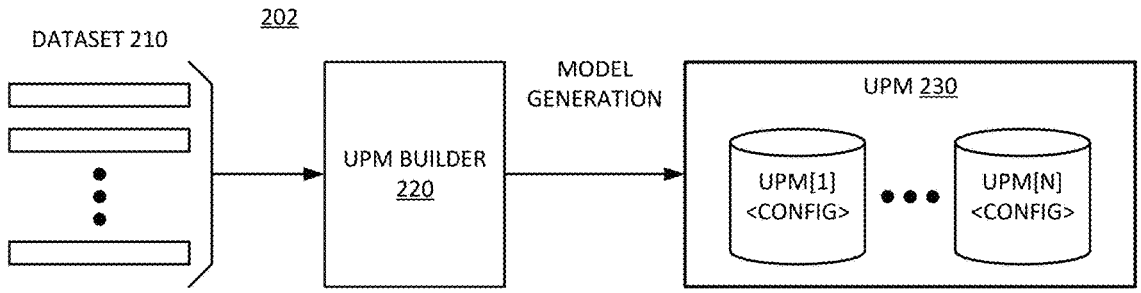
FIG. 2A is a block diagram of an example of uncorrectable error prediction training.

FIG. 2A is a block diagram of an example of uncorrectable error prediction training. System 202 represents elements of a training phase or a training system for prediction of memory fault due to uncorrectable error. System 202 can provide information for an example of UPM 142 of system 100. In one example, system 202 can be considered an offline prediction model training, in that dataset 210 represents data for past system operations. An online system refers to a system that is currently operational. System 202 is "operational" in the sense that it is operational to generate the model, but generates the model based on historical data rather than realtime or runtime data.

In one example, system 202 includes dataset 210. Dataset 210 can represent a large-scale CE and UE failure dataset that includes microlevel memory error information. The microlevel memory error information can include indications of failure based on bit, DQ row, column, device, rank, channel, DIMM, or other configuration, or a combination of information. In one example, dataset 210 includes a timestamp to indicate when errors occurred. In one example, dataset 210 includes hardware configuration information associated with the error dataset. The hardware configuration information can include information such as memory device information, DIMM manufacturer part number, CPU model number, system board details, or other information, or a combination of such information. In one example, dataset 210 can represent information collected from large-scale datacenter implementations.

System 202 includes UPM (UE prediction model) builder 220 to process data from dataset 210 to generate a model that indicates configurations with error patterns that are likely to result in a UE. In one example, UPM builder 220 represents software logic for AI (artificial intelligence) training to generate the model. In this context, AI represents neural network training or other form of data mining to identify patterns of relationship from large data sets. In one example, UPM builder 220 generates UPM 230 for each hardware configuration, based on microlevel (e.g., bit, DQ, row, column, device, rank) CE patterns or indicators. Thus, UPM 230 can include N different UPMs (UPM[1:N]) based on different configuration information (CONFIG).

In one example, UPM 230 includes a separate prediction model for each combination of a CPU model and a DIMM manufacturer or part number. Such granularity for different combinations of CPU model and DIMM part number can identify fault hardware patterns differently, seeing that the different hardware configurations can cause different hardware fault statuses. For example, DIMMs from the same manufacturer or with the same part number but with a different CPU model may implement ECC differently in the memory controller, causing the same faulty hardware status of a DIMM to exhibit different observations due to a different behavior of ECC implementation. A CPU family may provide multiple ECC patterns, allowing a customer to choose the ECC based on the application the customer selects. Similarly, for the same CPU model with a DIMM from a different manufacturer or with a different part number, the faulty status of a DIMM my exhibit different observations due to the different design and implementation of the DIMM hardware. Thus, in one example, system 202 creates prediction models per combination of CPU model and DIMM manufacture or part number to provide improved prediction accuracy performance.

Figure 2B:
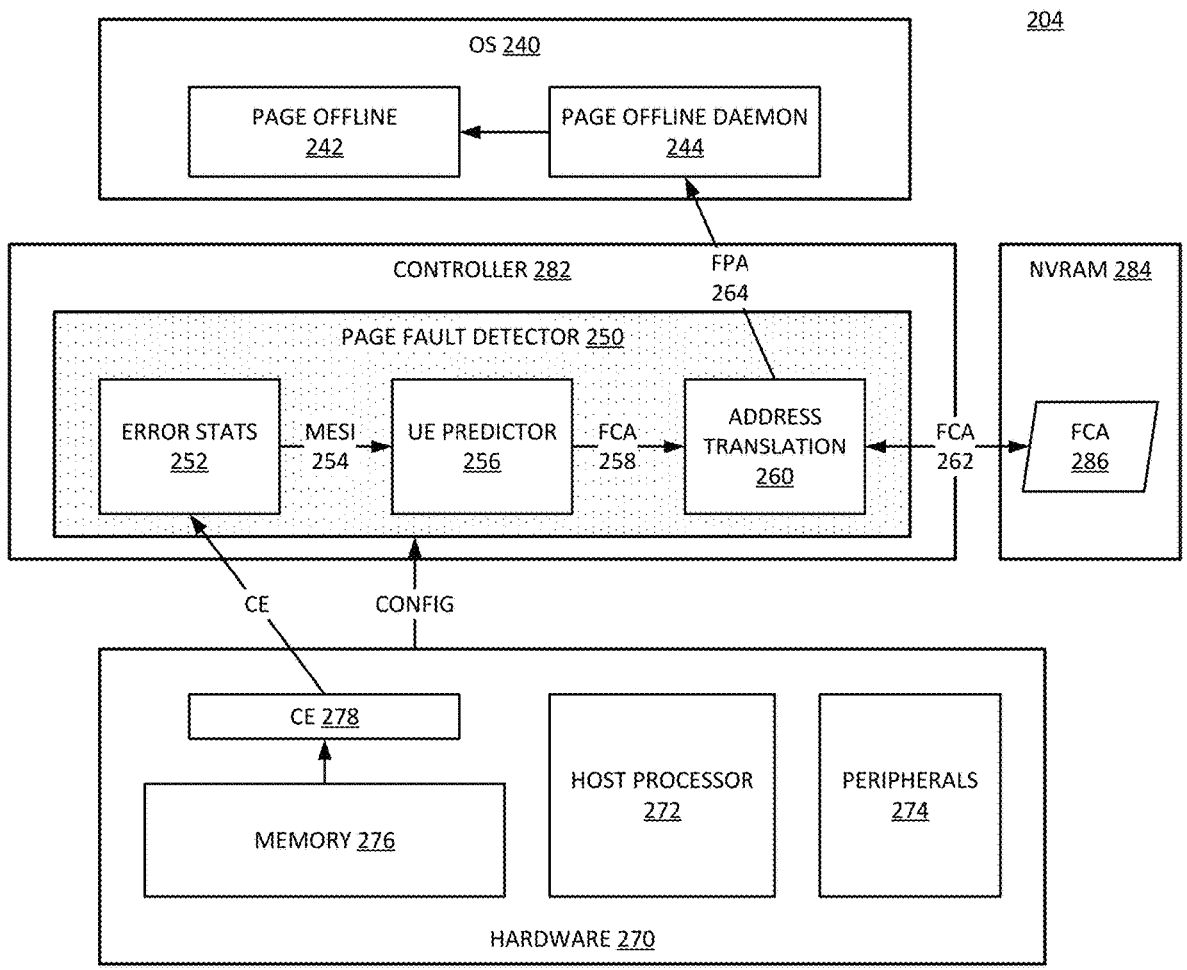
FIG. 2B is a block diagram of an example of faulty page prediction based on uncorrectable error prediction.

FIG. 2B is a block diagram of an example of faulty page prediction based on uncorrectable error prediction. System 204 represents an example of a system with faulty page prediction in accordance with an example of system 100. In one example, system 204 implements an example of UPM 230 of system 202 in UE predictor 256. Whereas system 202 can operate based on historical or stored information, system 204 can be considered a runtime memory failure prediction system in that system 204 operates on runtime or realtime parameters as they occur as well as on historical information.

In one example, system 202 of FIG. 2A provides a machine-learning based uncorrectable memory error prediction mechanism at the level of the memory device. In one example, system 204 utilizes system 202 to generate a runtime prediction of predicted page failure and expose the result through telemetry of the platform. For example, system 204 can generate memory error statistics indicators (MESI 254) and faulty component address (FCA 258) information to predict faulty pages, and generate faulty page address (FPA 264) information as information to pass to OS (operating system) 240.

System 204 includes controller 282, which can be a dedicated controller, or can represent firmware to execute on a shared controller or hardware shared with other control or management functions in the computer system. Controller 282 executes page fault detector 250, which represents an engine to generate page fault prediction in accordance with any example described. In one example, page fault detector 250 receives configuration information (CONFIG) from hardware 270 as correctable error (CE) information from memory 276.

Hardware 270 represents the hardware of the system to be monitored for memory errors. Hardware 270 provides hardware configuration to page fault detector 250 for prediction analysis. Hardware 270 can include host processor 272, which represents processing resources for a computer system, peripherals 274, and memory 276. Memory 276 represents the memory resources for which correctable errors can be identified. CE 278 represents the CE data for errors detected in data of memory 276.

Peripherals 274 represent components and features of hardware 270 that can change the handling of memory errors. Thus, hardware components and software/firmware configuration of the hardware components that can affect how memory errors are handled can be included for consideration in configuration information to send to page fault detector 250 for memory fault prediction. Examples of peripheral configuration can include peripheral control hub (PCH) configuration, management engine (ME) configuration, quick path interconnect (QPI) capability, or other components or capabilities.

Page fault detector 250 can include error statistics (stats) 252, UE predictor 256, and address translation 260. Error statistics 252 can utilize a system which represents an engine to gather and organize error information for system 204. Error statistics 252 can provide microlevel memory error statistics tracking. Error statistics 252 can receive CE information from CE 278, which represents the runtime CE data for memory 276. Error statistics 252 tracks and decodes the runtime CE data that indicates errors detected in memory 276 to obtain the micro-level information. In one example, error statistics 252 generates MESI 254 to provide to UE predictor 256.

UE predictor 256 can provide prediction of which components experiencing faults are UE-prone. In one example, UE predictor 256 implements a UE prediction engine based on UPM 230. UE predictor 256 can store or access UPM 230, which represents a model generated by UPM builder 220 of system 202. In one example, UE predictor 256 attributes detected CEs to the microlevel components indicated in the configuration information for the system architecture to infer whether the microlevel components are faulty.

UE predictor 256 generates a prediction of memory faults based on the hardware configuration and correctable error information. The UE prediction is made at the level of hardware. Thus, UE predictor 256 can generate FCA 258 to indicate specific hardware components of memory 276 that are predicted to fail (e.g., cells, bitlines (columns), wordlines (rows), banks, chips, ranks). In one example, UE predictor 256 determines whether faulty rows or cells are page-offlining friendly.

In one example, UE predictor 256 performs analysis on the CEs observed on faulty rows or cells. In one example, UE predictor 256 includes advanced microlevel fault indicators that built based on the knowledge of ECC coverage used by system 204. In one example, the microlevel fault indicators are built based on knowledge of the error-bit pattern distribution from the DIMM manufacturers to predict whether UEs are likely to happen in the future or not. UE predictor 256 can apply the fault indicators to pinpoint faulty rows or cells that are UE-prone.

In one example, UE predictor 256 passes FCA 258 to address translation 260 to map the specific components of specific memory devices to physical page address information. Thus, address translation 260 can perform a row address to physical page address translation. In one example, address translation 260 generates FCA 262, which represents physical memory addresses for faulty components. Address translation 260 can pass FCA 262 to NVRAM (nonvolatile random access memory) 284.

In one example, system 204 stores faulty addresses NVRAM 284. While NVRAM 284 is illustrated, the faulty addresses can be stored in flash memory or other persistent memory. NVRAM 284 enables system 204 to store FCA 286 persistently between boots. Certain memory faults will persist across power cycles of system 204. Thus, FCA 286 in NVRAM 284 can be updated and saved to inform the system of pages that should be offlined between system boots.

In one example, address translation 260 passes FPA (faulty page address) 264 to page offline daemon 244 of OS 240. Page offline daemon 244 represents a service or software agent of OS 240 that manages page offline information for system 204. Page fault detector 250 can pass information to OS 240 through page offline daemon 244 to indicate pages the OS should offline. Page offline daemon 244 can move information of programs using pages to offline to other areas of memory. Page offline daemon 244 can then offline a page to make it unavailable. Page offline 242 represents offlined pages by OS 240. OS 240 can prevent programs from accessing the offlined pages in system 204.

Page fault detector 250 can provide a policy of page prediction based on understanding of microlevel faults to detect pages that are prone to UEs. Page fault detector 250 can notify and guide OS 240 to perform effective memory page offlining. In one example, page fault detector 250 can conduct memory testing on components identified as faulty, for which pages have been offlined by OS 240. If the faulty component is detected as recovered, for example, when previous CEs caused by transient faults are no longer present, page fault detector 250 can notify OS 240 to reuse the spared memory capacity.

Figure 3A:
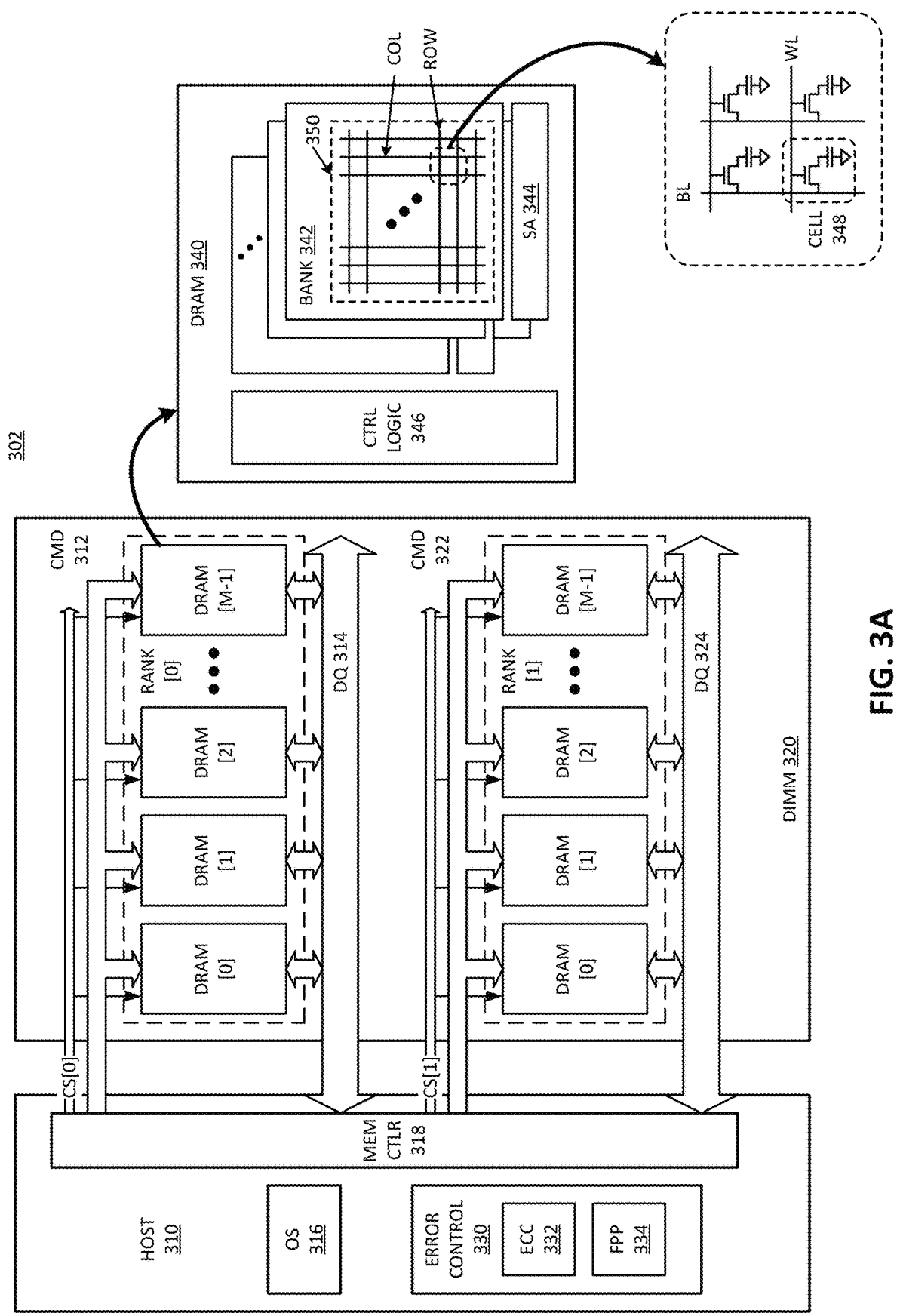
FIG. 3A is a block diagram of an example of a system architecture for faulty page prediction.

FIG. 3A is a block diagram of an example of a system architecture for faulty page prediction. System 302 illustrates a computer system in accordance with an example of system 100 or an example of system 204. System 302 includes host 310 connected to DIMM 320. Host 310 represents the host hardware platform for the system in which DIMM 320 operates. Host 310 includes a host processor (not explicitly shown) to execute operations that request access to memory of DIMM 320.

DIMM 320 includes multiple memory devices identified as DRAM (dynamic random access memory) devices or DRAMs connected in parallel to process access commands. DIMM 320 is more specifically illustrated as a two-rank DIMM, with M DRAMs (DRAM[0:M−1]) in each rank, Rank 0 and Rank 1. M can be any integer. Typically, a rank of DRAMs includes data DRAMs to store user data and ECC DRAMs to store system ECC bits and metadata. System 302 does not distinguish DRAM purpose. In one example, the DRAM devices of system 302 represents DRAM devices compatible with a double data rate version 5 (DDR5) standard from JEDEC (Joint Electron Device Engineering Council, now the JEDEC Solid State Technology Association).

The DRAMs of a rank share a command bus and chip select signal lines, and have individual data bus interfaces. CMD (command) 312 represents a command bus for Rank 0 and CMD (command) 322 represents the command bus for Rank 1. The command bus could alternatively be referred to as a command and address bus. CS0 represents a chip select for the devices of Rank 0 and CS1 represents the chip select for the devices of Rank 1. DQ 314 represents the data (DQ) bus for the devices of Rank 0, where each DRAM contributes B bits, where B is an integer, for a total of B*M bits on the DQ bus. DQ 324 represents the data (DQ) bus for the devices of Rank 1.

DRAM 340 provides a representation of an example of details for each DRAM device of system 302. DRAM 340 includes control (CTRL) logic 346, which represents logic to receive and decode commands. Control logic 346 provides internal control signals to respond to commands received on the command bus. DRAM 340 includes multiple banks 342, where the banks represent an organization of the memory array of DRAM 340. Banks 342 have individual access hardware to allow access in parallel or non-blocking access to different banks. Subarray 350 of bank 342 is described below with respect to FIG. 3B. The portion labeled as 350 is a subarray of the total memory array of DRAM 340.

The memory array includes rows (ROW) and columns (COL) of memory elements. SA (sense amplifier) 344 represents a sense amplifier to stage data for a read from the memory array or for a write to the memory array. Data can be selected into the sense amplifiers to allow detection of the value stored in a bit cell or memory cell of the array. The dashed box that includes the intersection of the labeled row and column of the memory array. The dashed portion illustrated a typical DRAM cell 348, including a transistor as a control element and a capacitor as a storage element.

Memory controller (MEM CTLR) 318 represents a memory controller that manages access to the memory resources of DIMM 320. Memory controller 318 provides access commands to the memory devices, including sending data for a write command or receiving data for a read command. Memory controller 318 sends command and address information to the DRAM devices and exchanges data bits with the DRAM devices (either to or from, depending on the command type).

Host 310 includes OS 316, which represents a host operating system on host 310. OS 316 can manage memory space available for programs executed by host 310. OS 316 can offline pages based on indications from faulty page prediction. In one example, host 310 includes error control 330. Error control 330 represents logic in system 302 to perform error management for the DRAM devices. In one example, error control includes ECC 332, which represents system-level ECC for error correction of data to store in the various DRAM devices. System-level ECC can perform error correction based on data stored across the DRAMs of a rank.

In one example, error control 330 includes faulty page predictor (FPP) 334, which represents a faulty page prediction engine, such as page fault detector 250 of system 204. In one example, host 310 represents a motherboard. Faulty page predictor 334 can be implemented in a controller on the motherboard. Faulty page predictor 334 receives information indicating correctable errors for the DRAMs, correlates the CE information with device architecture information, and identifies pages that are likely to experience UEs based on the correlation of the data. Faulty page predictor 334 can generate a prediction that indicates pages to OS 316 that should be offlined based on a likelihood that an uncorrectable error will occur in a given page.

Figure 3B:
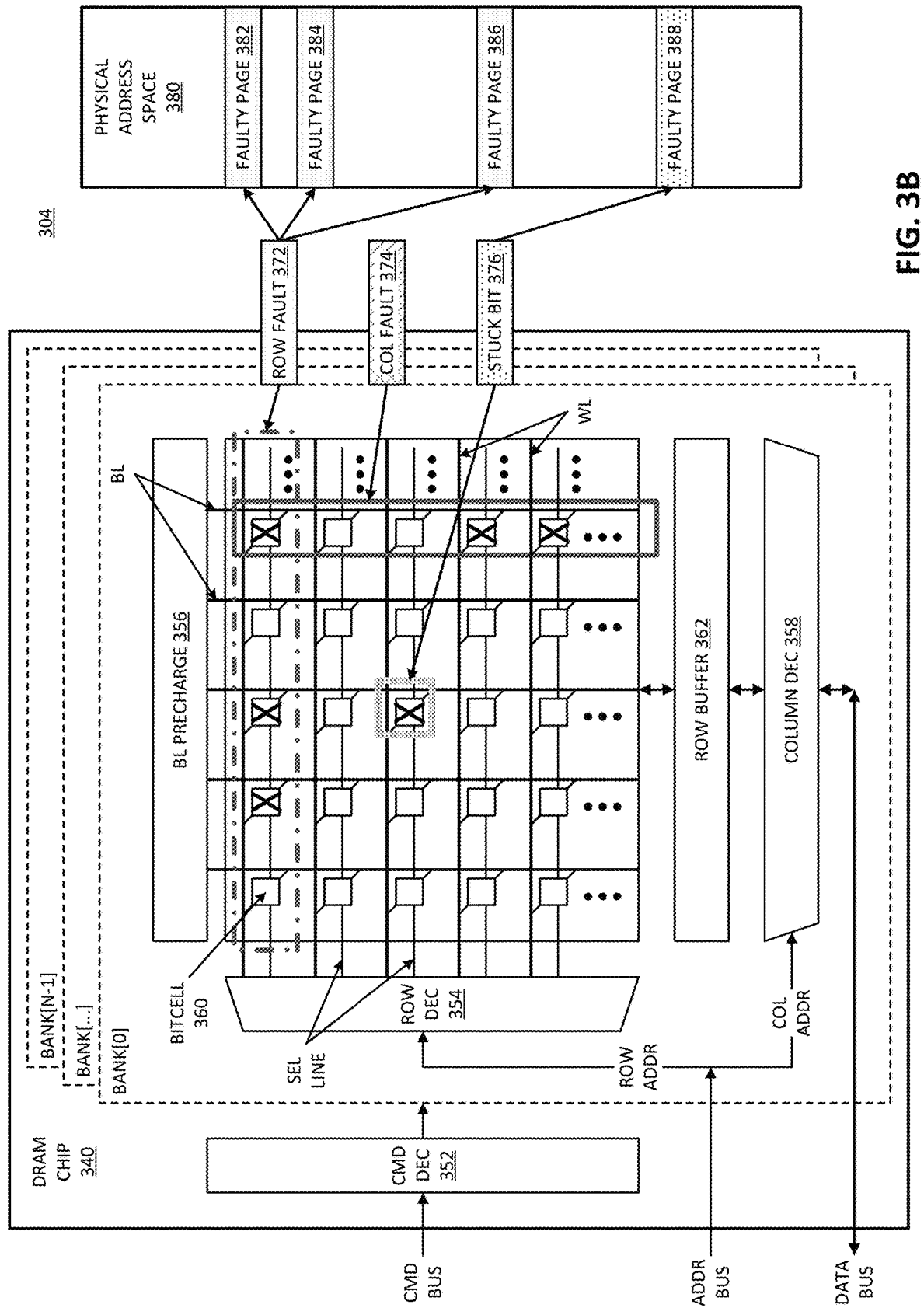
FIG. 3B is a block diagram of an example of faulty page prediction based on memory architecture.

FIG. 3B is a block diagram of an example of faulty page prediction based on memory architecture. System 304 provides an example of system 302, where details of the DRAM are illustrated, as is the physical address space managed by the host OS.

Bitcell 360 represents a memory cell or a storage location of the memory array. Bitcell 360 connects to a wordline and a bitline, with the specific WL/BL location representing an address identifiable by a combination of row (WL) and column (BL) address. The select line can enable selection of the wordline.

Row decoder (DEC) 354 represents decoding hardware to select rows or wordlines for read, write, or other access. Row decoder 354 can receive a voltage for a wordline (Vwl) and a voltage for a select line (Vsl) and provide appropriate voltages for selection of a row based on row address (ADDR) information received for an operation.

BL (bitline) precharge 356 represents hardware that can charge one or more selected columns or bitlines for an access operation. BL precharge 356 can charge the bitlines for reading to enable sensing the value stored in a bitcell identified by column and row address. Row buffer 362 represents a buffer for reading or writing bits of the array, and can be implemented as a sense amplifier. Column decoder (DEC) 358 represents hardware to select the output columns or bitlines. Column decoder 358 selects bitlines based on column address information received for an operation.

DRAM chip 340 is illustrated with N banks, Bank[0:(N−1)]. N can be an integer, and is typically a binary number such as 8 or 16. DRAM chip 340 can include command (CMD) decoder (DEC) 352 to decode command information. As illustrated in system 304, the command (CMD) bus is separate from the address (ADDR) bus, although they may be considered a single command and address control bus. They are illustrated in system 304 for purposes of illustrating the separation of the command from the address information.

Column decoder 358 is shown connecting to the data bus, to receive data for write operations, and to provide data for read operations. For a write operation, data is received on the data bus and placed in row buffer 362 to write to the memory array. For a read operation, data is fetched from the memory array in row buffer 362, to be provided out the data bus to the host.

System 304 illustrates three different types of faults for the memory array of Bank[0]. The dashed box surrounds one of the rows to indicate row fault 372. The dark shaded box surrounds one of the columns to indicate column (COL) fault 374. The light shaded box surrounds one of the bitcells to indicate stuck bit 376. The row fault, column fault, and stuck bit fault can each be associated with a fault indicator.

The OS manages the memory at the page level, represented by physical address space 380. Physical address space 380 represents multiple pages, which can be physical memory pages. Not all pages are shown in system 304. System 304 identifies pages associated with the different faults identified. Consider a scenario where row fault 372 is associated with three different pages, identified as faulty page 382, faulty page 384, and faulty page 386. Stuck bit 376 is associated with faulty page 388. The pages associated with column fault 374 are not illustrated, seeing that pages are associated with the column.

Memory is typically managed with memory interleaving. With memory interleaving, continuous address space is spread across different rows. One page can be spread over many rows. Row fault 372 can be a good candidate for page offlining, seeing that three faulty pages can be identified as associated with the page. Stuck bit 376 can also be a good candidate for page offlining, as it is associated with a single faulty page 388. Column fault 374 is not a good candidate for page offlining, seeing that all pages would need to be offlined.

In one example, to infer a row (wordline) fault, the system tracks the number of unique locations with errors observed in a row and tracks the minimum range that covers those locations. For example, the maximum bitline index and minimum bitline index with errors observed. In one example, when either or both of the unique error location and minimum errors range reach a threshold, the system regards the row as faulty.

In one example, to infer a cell fault or stuck bit, the system tracks the number of errors observed in a specific cell. In one example, when the number of errors reaches a threshold, the system identifies the cell as faulty.

To predict whether a faulty row or cell is likely to lead to UEs, the system can include advanced indicators based on the ECC coverage and the error bit pattern distribution knowledge. In one example, the indicators can identify whether a fault will be fully correctable by ECC or whether the fault will not be fully correctable by ECC. For pages with faults that are fully correctable with ECC patterns, the pages do not necessarily need to be offlined.

FIG. 4 is a table illustrating an example of a layout of faulty page address. Table 400 provides an example storage layout for faulty page address telemetry to be stored and sent to the host OS based on faulty page prediction from correlation of detected errors with hardware indicators.

In one example, table 400 shows the format of a data structure to be stored in a secure storage accessible to a faulty page predictor. In one example, table 400 shows the format of data sent from a faulty page predictor to the host OS. In one example, the format of table 400 includes faulty page address (FPA) header 410. The body or payload of the FPA data can include configuration data block (CDB) 412. CDB 412 provides information about a hardware configuration associated with the score. In one example, CDB 412 includes runtime context of the memory, such as uptimes and number of boots.

The body of the FPA data can include FPA data block (FDB) 414. In one example, FDB 414 includes FDB header 420. FDB 414 can include an indication of faulty pages as generated by the faulty page prediction. Row 422 indicates Faulty Page [0]. Row 424 indicates Faulty Page [1]. Row 432 indicates Faulty Page [P−2]. Row 434 indicates Faulty Page [P−1]. P can be any integer. The number, P, of faulty pages can dynamically change during runtime of a system based on monitoring of data errors and correlation with hardware configuration information. The faulty page predictor can identify pages associated with a predicted UE and add the page address information to FPA data block 414.

FIG. 5A is a diagrammatic representation of an example of faulty page prediction. Diagram 502 represents a graph of UEs avoided (y-axis, illustrated from 0-60) versus pages offlined (x-axis, illustrated from 0-2500). Diagram 502 includes curve 520 representing traditional offlining policies, and curve 510 representing faulty page prediction in accordance with what is described herein.

Curve 510 and curve 520 were generated based on an empirical evaluation of the error log from a large dataset for a server environment. Curve 520 represents the baseline of traditional offlining policies based on CE rate. As illustrated, even with close to 2500 pages offlined, the CE count methods avoided fewer than 10 UEs.

In contrast, curve 510 represents page offlining based on fault-aware prediction-based page offlining. It can be observed that even at the lower number of pages offlined (approximately 500), the fault-aware approach avoided more than 10 UEs. When the number of pages offlined was greater than 2000, the number of UEs avoided was greater than 50, representing improvement of 4× on the low end, and greater than 5× on the higher end.

FIG. 5B is a table of an example of faulty page prediction values for the graph of FIG. 5A. Table 504 illustrates specific data as graphed in diagram 502.

Row 532 represents a traditional WINDOWS method. It will be understood that all trademarks are used herein solely for purposes of identification, and the trademarks are the property of their respective owners. WINDOWS is a trademark of Microsoft, Inc. Row 532 represents a traditional policy of 16 errors detected in a 24-hour period. As illustrated, the number of pages offlined was 499, which avoided 3 UEs.

In comparison to row 532, row 534 represents a fault-aware approach with a threshold of 20 errors. The number of pages offlined was similar, with 480 pages offlined, but the UEs avoided were greater than 4×, with 13 UEs avoided.

Row 536 represents a traditional Linux method with a policy of 10 errors detected in a 24-hour period. With such an approach, 1005 pages were offlined, resulting in 6 UEs being avoided. In contrast, row 538 represents a fault-aware approach with a threshold of 15 errors. The number of pages offlined was similar, with 1152 pages offlined, while the number of UEs avoided was 27, or greater than 4× improvement.

Row 540 represents an aggressive traditional method, with 6 CEs detected in a 24-hour period. Such an approach resulted in 2437 pages being offlined, avoiding 9 UEs. In contrast, row 542 represents a fault-aware approach with a threshold of 5 errors, which resulted in 2184 pages being offlined, and 57 UEs being avoided, or greater than 6× improvement.

Figure 6:
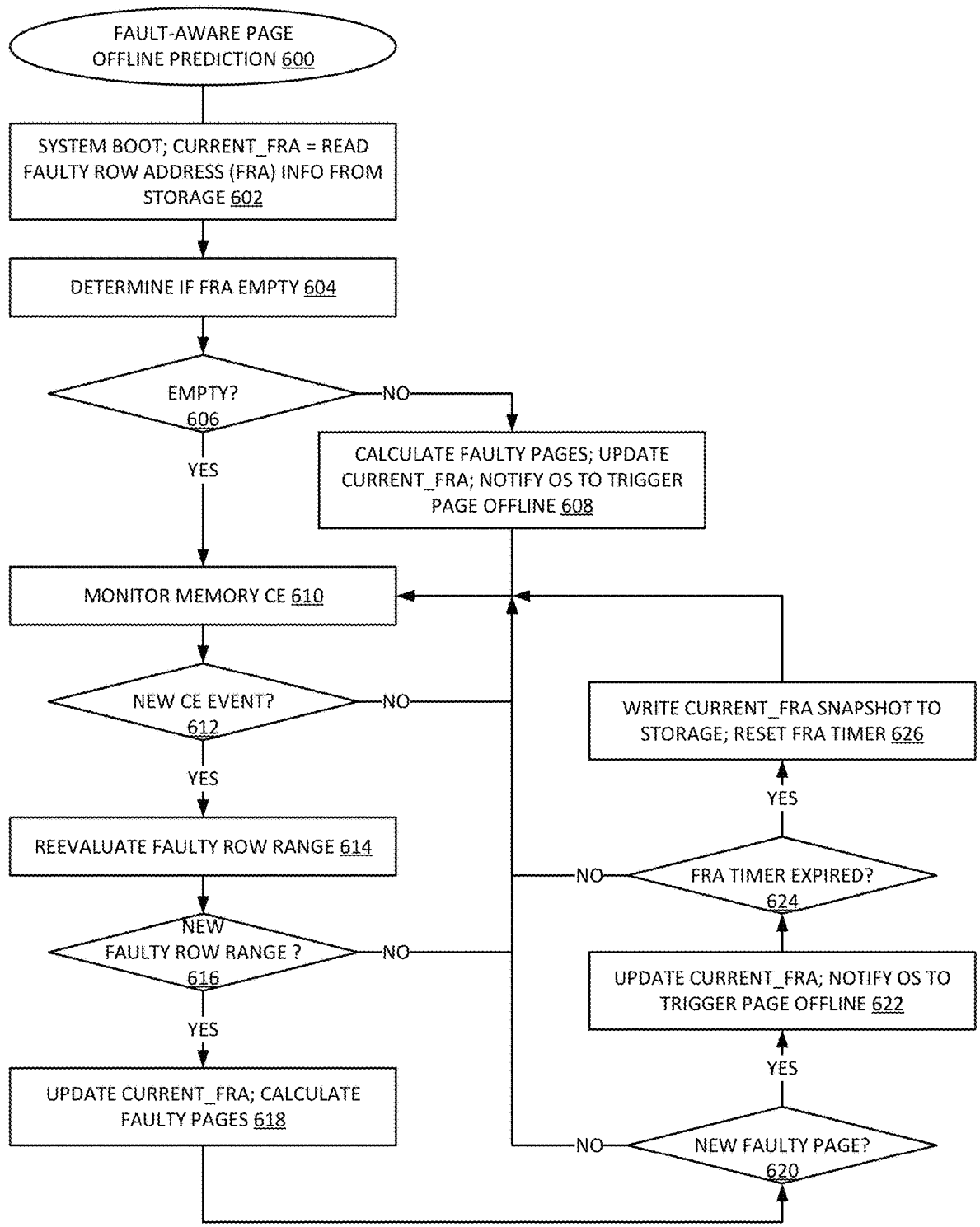
FIG. 6 is a flow diagram of an example of a process for predicting faulty pages.

FIG. 6 is a flow diagram of an example of a process for predicting faulty pages. Process 600 illustrates a flow that can be executed by a system with a faulty page predictor in accordance with an example of system 100. Process 600 represents a process to perform page offlining based on fault-aware prediction.

In one example, on system boot, the controller reads faulty row address (FRA) information from storage as a Current_FRA indication, at 602. In one example, the controller determines if the Current_FRA is empty, at 604, meaning there are no faulty pages indicated. If the FRA is not empty, at 606 NO branch, faulty page predictor can calculate faulty pages based on microlevel error information correlated with hardware configuration information, and update the Current_FRA, at 608. The controller can notify the OS to trigger page offlining for the page addresses indicated in the Current_FRA, at 608.

If the FRA is empty and there are no faulty pages identified, at 606 YES branch, in one example, the faulty page predictor monitors memory CEs, at 610. After calculating the faulty page addresses and notifying the faulty pages to the OS, at 608, the faulty page predictor can continue to monitor memory CEs, at 610.

If the faulty page predictor does not predict a new CE event, at 612 NO branch, the faulty page predictor continues to monitor memory for CEs, at 610. If a new CE event is detected, at 612 YES branch, the faulty page predictor can reevaluate the faulty row range, at 614. If the CE event indicates a predicted UE in an existing faulty, indicating no new faulty row range, at 616 NO branch, the faulty page predictor can continue to monitor memory for CEs, at 610.

In one example, the CE indicates a predicted UE in a new row, there is a new faulty row range, at 616 YES branch, and the faulty page predictor can update the Current_FRA and calculate the faulty pages, at 618. If the faulty page predictor does not generate a prediction of a new faulty page, at 620 NO branch, the faulty page predictor can continue to monitor memory for CEs, at 610.

If the calculations indicate that a new faulty page has been detected, at 620 YES branch, in one example, the faulty page predictor updates the Current_FRA and notifies the OS to trigger a page offline for the new faulty page detected, at 622. The faulty page predictor can maintain a timer to store the Current_FRA information to storage. If the FRA timer has not expired, at 624 NO branch, the faulty page predictor can continue to monitor memory for CEs, at 610.

If the FRA timer has expired, at 624 YES branch, in one example, the faulty page predictor writes the Current_FRA snapshot to storage and resets the FRA timer, at 626. The faulty page predictor can then continue to monitor memory for CEs, at 610.

Figure 7:
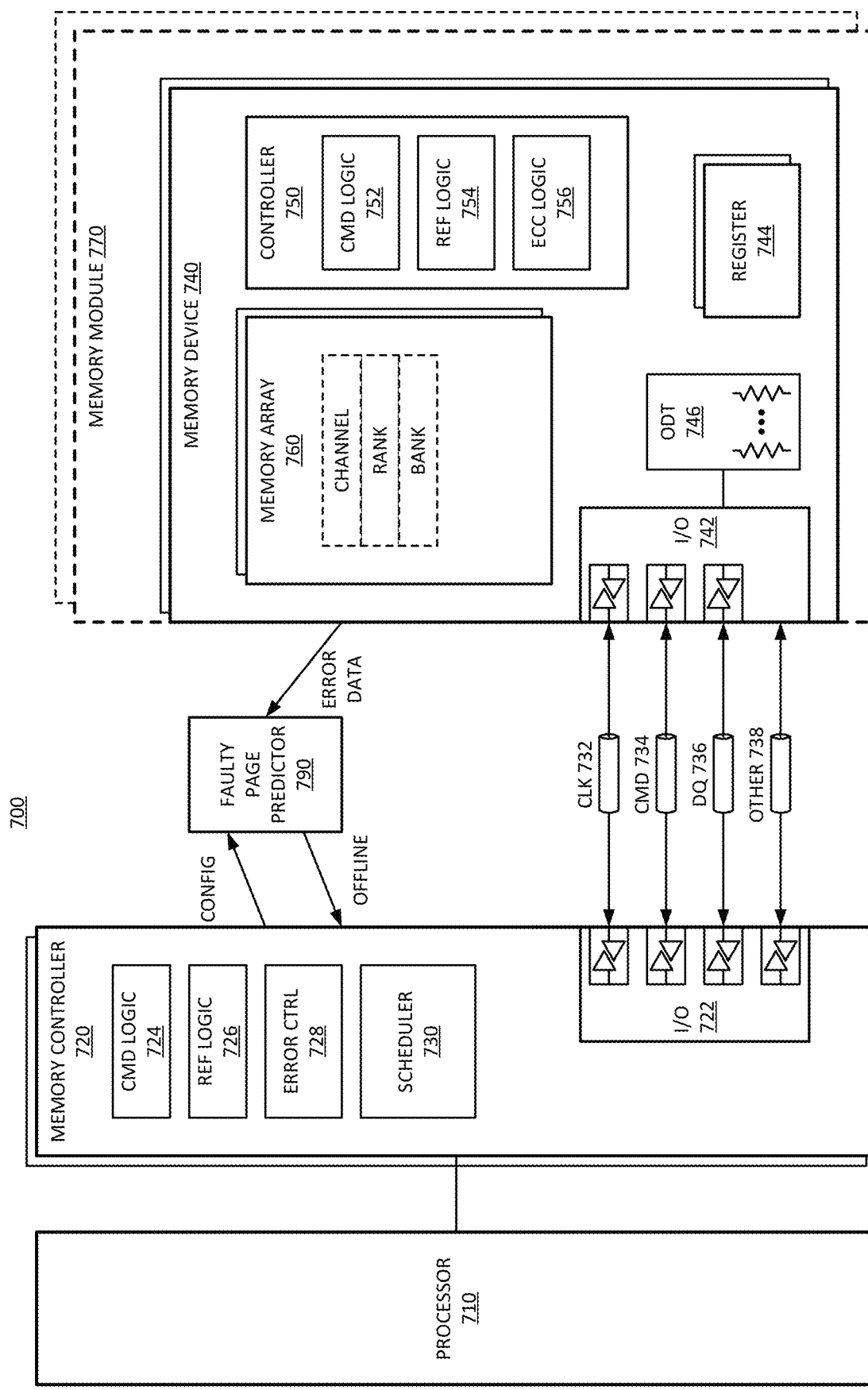
FIG. 7 is a block diagram of an example of a memory subsystem in which faulty page prediction can be implemented.

FIG. 7 is a block diagram of an example of a memory subsystem in which faulty page prediction can be implemented. System 700 includes a processor and elements of a memory subsystem in a computing device. System 700 is an example of a system in accordance with an example of system 100.

In one example, system 700 includes faulty page predictor 790 or other error prediction engine to compute pages having a likelihood an uncorrectable error will occur. Faulty page predictor 790 can correlate correctable errors detected with hardware configuration to determine a likelihood an uncorrectable error will occur, and determine what pages are associated with the likely UE. ECC (error checking and correction) logic 756 represents ECC logic on-memory that can detect and identify faults or CEs for system 700. Error control (CTRL) 728 represents error control logic in memory controller 720, which can include ECC logic to detect and identify faults or CEs for system 700. Based on detected faults, faulty page predictor 790 can determine the likelihood a UE will occur. Faulty page predictor 790 can provide an indication of faulty pages to a host operating system (not explicitly shown), which can then offline the pages. Faulty page predictor 790 can be on a system board of system 700. Faulty page predictor 790 can perform prediction in accordance with any example herein.

Processor 710 represents a processing unit of a computing platform that may execute an operating system (OS) and applications, which can collectively be referred to as the host or the user of the memory. The OS and applications execute operations that result in memory accesses. Processor 710 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 700 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 (HBM version 2, JESD235C, originally published by JEDEC in January 2020), HBM3 (HBM version 3 currently in discussion by JEDEC), or others or combinations of memory technologies, and technologies based on derivatives or extensions of such specifications.

Memory controller 720 represents one or more memory controller circuits or devices for system 700. Memory controller 720 represents control logic that generates memory access commands in response to the execution of operations by processor 710. Memory controller 720 accesses one or more memory devices 740. Memory devices 740 can be DRAM devices in accordance with any referred to above. In one example, memory devices 740 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 720 manages a separate memory channel, although system 700 can be configured to have multiple channels managed by a single controller, or to have multiple controllers on a single channel. In one example, memory controller 720 is part of host processor 710, such as logic implemented on the same die or implemented in the same package space as the processor.

Memory controller 720 includes I/O interface logic 722 to couple to a memory bus, such as a memory channel as referred to above. I/O interface logic 722 (as well as I/O interface logic 742 of memory device 740) can include pins, pads, connectors, signal lines, traces, or wires, or other hardware to connect the devices, or a combination of these. I/O interface logic 722 can include a hardware interface. As illustrated, I/O interface logic 722 includes at least drivers/transceivers for signal lines. Commonly, wires within an integrated circuit interface couple with a pad, pin, or connector to interface signal lines or traces or other wires between devices. I/O interface logic 722 can include drivers, receivers, transceivers, or termination, or other circuitry or combinations of circuitry to exchange signals on the signal lines between the devices. The exchange of signals includes at least one of transmit or receive. While shown as coupling I/O 722 from memory controller 720 to I/O 742 of memory device 740, it will be understood that in an implementation of system 700 where groups of memory devices 740 are accessed in parallel, multiple memory devices can include I/O interfaces to the same interface of memory controller 720. In an implementation of system 700 including one or more memory modules 770, I/O 742 can include interface hardware of the memory module in addition to interface hardware on the memory device itself. Other memory controllers 720 will include separate interfaces to other memory devices 740.

The bus between memory controller 720 and memory devices 740 can be implemented as multiple signal lines coupling memory controller 720 to memory devices 740. The bus may typically include at least clock (CLK) 732, command/address (CMD) 734, and write data (DQ) and read data (DQ) 736, and zero or more other signal lines 738. In one example, a bus or connection between memory controller 720 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 700 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 720 and memory devices 740. An example of a serial bus technology is 8B10B encoding and transmission of high-speed data with embedded clock over a single differential pair of signals in each direction. In one example, CMD 734 represents signal lines shared in parallel with multiple memory devices. In one example, multiple memory devices share encoding command signal lines of CMD 734, and each has a separate chip select (CS_n) signal line to select individual memory devices.

It will be understood that in the example of system 700, the bus between memory controller 720 and memory devices 740 includes a subsidiary command bus CMD 734 and a subsidiary bus to carry the write and read data, DQ 736. In one example, the data bus can include bidirectional lines for read data and for write/command data. In another example, the subsidiary bus DQ 736 can include unidirectional write signal lines for write and data from the host to memory, and can include unidirectional lines for read data from the memory to the host. In accordance with the chosen memory technology and system design, other signals 738 may accompany a bus or sub bus, such as strobe lines DQS. Based on design of system 700, or implementation if a design supports multiple implementations, the data bus can have more or less bandwidth per memory device 740. For example, the data bus can support memory devices that have either a x4 interface, a x8 interface, a x16 interface, or other interface. The convention "xW," where W is an integer that refers to an interface size or width of the interface of memory device 740, which represents a number of signal lines to exchange data with memory controller 720. The interface size of the memory devices is a controlling factor on how many memory devices can be used concurrently per channel in system 700 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 740 and memory controller 720 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 740 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

Memory devices 740 represent memory resources for system 700. In one example, each memory device 740 is a separate memory die. In one example, each memory device 740 can interface with multiple (e.g., 2) channels per device or die. Each memory device 740 includes I/O interface logic 742, which has a bandwidth determined by the implementation of the device (e.g., x16 or x8 or some other interface bandwidth). I/O interface logic 742 enables the memory devices to interface with memory controller 720. I/O interface logic 742 can include a hardware interface, and can be in accordance with I/O 722 of memory controller, but at the memory device end. In one example, multiple memory devices 740 are connected in parallel to the same command and data buses. In another example, multiple memory devices 740 are connected in parallel to the same command bus, and are connected to different data buses. For example, system 700 can be configured with multiple memory devices 740 coupled in parallel, with each memory device responding to a command, and accessing memory resources 760 internal to each. For a Write operation, an individual memory device 740 can write a portion of the overall data word, and for a Read operation, an individual memory device 740 can fetch a portion of the overall data word. The remaining bits of the word will be provided or received by other memory devices in parallel.

In one example, memory devices 740 are disposed directly on a motherboard or host system platform (e.g., a PCB (printed circuit board) or substrate on which processor 710 is disposed) of a computing device. In one example, memory devices 740 can be organized into memory modules 770. In one example, memory modules 770 represent dual inline memory modules (DIMMs). In one example, memory modules 770 represent other organization of multiple memory devices to share at least a portion of access or control circuitry, which can be a separate circuit, a separate device, or a separate board from the host system platform. Memory modules 770 can include multiple memory devices 740, and the memory modules can include support for multiple separate channels to the included memory devices disposed on them. In another example, memory devices 740 may be incorporated into the same package as memory controller 720, such as by techniques such as multi-chip-module (MCM), package-on-package, through-silicon via (TSV), or other techniques or combinations. Similarly, in one example, multiple memory devices 740 may be incorporated into memory modules 770, which themselves may be incorporated into the same package as memory controller 720. It will be appreciated that for these and other implementations, memory controller 720 may be part of host processor 710.

Memory devices 740 each include one or more memory arrays 760. Memory array 760 represents addressable memory locations or storage locations for data. Typically, memory array 760 is managed as rows of data, accessed via wordline (rows) and bitline (individual bits within a row) control. Memory array 760 can be organized as separate channels, ranks, and banks of memory. Channels may refer to independent control paths to storage locations within memory devices 740. Ranks may refer to common locations across multiple memory devices (e.g., same row addresses within different devices) in parallel. Banks may refer to sub-arrays of memory locations within a memory device 740. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 740 include one or more registers 744. Register 744 represents one or more storage devices or storage locations that provide configuration or settings for the operation of the memory device. In one example, register 744 can provide a storage location for memory device 740 to store data for access by memory controller 720 as part of a control or management operation. In one example, register 744 includes one or more Mode Registers. In one example, register 744 includes one or more multipurpose registers. The configuration of locations within register 744 can configure memory device 740 to operate in different "modes," where command information can trigger different operations within memory device 740 based on the mode. Additionally or in the alternative, different modes can also trigger different operation from address information or other signal lines depending on the mode. Settings of register 744 can indicate configuration for I/O settings (e.g., timing, termination or ODT (on-die termination) 746, driver configuration, or other I/O settings).

In one example, memory device 740 includes ODT 746 as part of the interface hardware associated with I/O 742. ODT 746 can be configured as mentioned above, and provide settings for impedance to be applied to the interface to specified signal lines. In one example, ODT 746 is applied to DQ signal lines. In one example, ODT 746 is applied to command signal lines. In one example, ODT 746 is applied to address signal lines. In one example, ODT 746 can be applied to any combination of the preceding. The ODT settings can be changed based on whether a memory device is a selected target of an access operation or a non-target device. ODT 746 settings can affect the timing and reflections of signaling on the terminated lines. Careful control over ODT 746 can enable higher-speed operation with improved matching of applied impedance and loading. ODT 746 can be applied to specific signal lines of I/O interface 742, 722 (for example, ODT for DQ lines or ODT for CA lines), and is not necessarily applied to all signal lines.

Memory device 740 includes controller 750, which represents control logic within the memory device to control internal operations within the memory device. For example, controller 750 decodes commands sent by memory controller 720 and generates internal operations to execute or satisfy the commands. Controller 750 can be referred to as an internal controller, and is separate from memory controller 720 of the host. Controller 750 can determine what mode is selected based on register 744, and configure the internal execution of operations for access to memory resources 760 or other operations based on the selected mode. Controller 750 generates control signals to control the routing of bits within memory device 740 to provide a proper interface for the selected mode and direct a command to the proper memory locations or addresses. Controller 750 includes command logic 752, which can decode command encoding received on command and address signal lines. Thus, command logic 752 can be or include a command decoder. With command logic 752, memory device can identify commands and generate internal operations to execute requested commands.

Referring again to memory controller 720, memory controller 720 includes command (CMD) logic 724, which represents logic or circuitry to generate commands to send to memory devices 740. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 740, memory controller 720 can issue commands via I/O 722 to cause memory device 740 to execute the commands. In one example, controller 750 of memory device 740 receives and decodes command and address information received via I/O 742 from memory controller 720. Based on the received command and address information, controller 750 can control the timing of operations of the logic and circuitry within memory device 740 to execute the commands. Controller 750 is responsible for compliance with standards or specifications within memory device 740, such as timing and signaling requirements. Memory controller 720 can implement compliance with standards or specifications by access scheduling and control.

Memory controller 720 includes scheduler 730, which represents logic or circuitry to generate and order transactions to send to memory device 740. From one perspective, the primary function of memory controller 720 could be said to schedule memory access and other transactions to memory device 740. Such scheduling can include generating the transactions themselves to implement the requests for data by processor 710 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 720 typically includes logic such as scheduler 730 to allow selection and ordering of transactions to improve performance of system 700. Thus, memory controller 720 can select which of the outstanding transactions should be sent to memory device 740 in which order, which is typically achieved with logic much more complex that a simple first-in first-out algorithm. Memory controller 720 manages the transmission of the transactions to memory device 740, and manages the timing associated with the transaction. In one example, transactions have deterministic timing, which can be managed by memory controller 720 and used in determining how to schedule the transactions with scheduler 730.

In one example, memory controller 720 includes refresh (REF) logic 726. Refresh logic 726 can be used for memory resources that are volatile and need to be refreshed to retain a deterministic state. In one example, refresh logic 726 indicates a location for refresh, and a type of refresh to perform. Refresh logic 726 can trigger self-refresh within memory device 740, or execute external refreshes which can be referred to as auto refresh commands) by sending refresh commands, or a combination. In one example, controller 750 within memory device 740 includes refresh logic 754 to apply refresh within memory device 740. In one example, refresh logic 754 generates internal operations to perform refresh in accordance with an external refresh received from memory controller 720. Refresh logic 754 can determine if a refresh is directed to memory device 740, and what memory resources 760 to refresh in response to the command.

Figure 8:
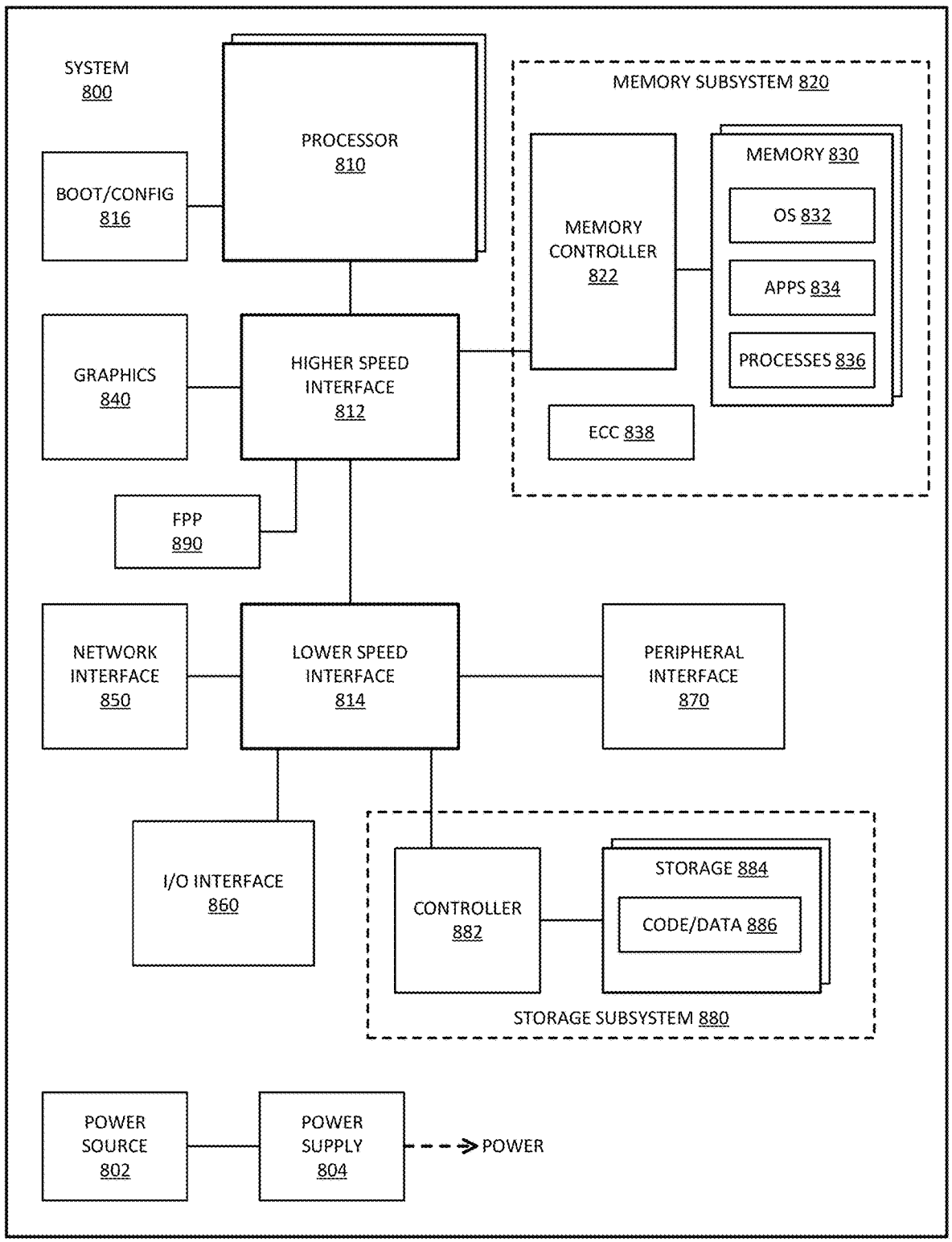
FIG. 8 is a block diagram of an example of a computing system in which faulty page prediction can be implemented.

FIG. 8 is a block diagram of an example of a computing system in which faulty page prediction can be implemented. System 800 represents a computing device in accordance with any example herein, and can be a laptop computer, a desktop computer, a tablet computer, a server, a gaming or entertainment control system, embedded computing device, or other electronic device.

System 800 is an example of a system in accordance with an example of system 100. In one example, system 800 includes faulty page predictor (FPP) 890 or other error prediction engine to compute pages having a likelihood an uncorrectable error will occur. Faulty page predictor 890 can correlate correctable errors detected with hardware configuration to determine a likelihood an uncorrectable error will occur, and determine what pages are associated with the likely UE. Memory subsystem 820 includes ECC (error checking and correction) 838, which represents ECC logic that can detect and identify faults or CEs for system 800. Based on detected faults, FPP 890 can determine the likelihood a UE will occur. Faulty page predictor 890 can provide an indication of faulty pages to a host operating system (not explicitly shown), which can then offline the pages. Faulty page predictor 890 can be on a system board of system 800. Faulty page predictor 890 can perform prediction in accordance with any example herein.

System 800 includes processor 810 can include any type of microprocessor, central processing unit (CPU), graphics processing unit (GPU), processing core, or other processing hardware, or a combination, to provide processing or execution of instructions for system 800. Processor 810 can be a host processor device. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or a combination of such devices.

System 800 includes boot/config 816, which represents storage to store boot code (e.g., basic input/output system (BIOS)), configuration settings, security hardware (e.g., trusted platform module (TPM)), or other system level hardware that operates outside of a host OS. Boot/config 816 can include a nonvolatile storage device, such as read-only memory (ROM), flash memory, or other memory devices.

In one example, system 800 includes interface 812 coupled to processor 810, which can represent a higher speed interface or a high throughput interface for system components that need higher bandwidth connections, such as memory subsystem 820 or graphics interface components 840. Interface 812 represents an interface circuit, which can be a standalone component or integrated onto a processor die. Interface 812 can be integrated as a circuit onto the processor die or integrated as a component on a system on a chip. Where present, graphics interface 840 interfaces to graphics components for providing a visual display to a user of system 800. Graphics interface 840 can be a standalone component or integrated onto the processor die or system on a chip. In one example, graphics interface 840 can drive a high definition (HD) display or ultra high definition (UHD) display that provides an output to a user. In one example, the display can include a touchscreen display. In one example, graphics interface 840 generates a display based on data stored in memory 830 or based on operations executed by processor 810 or both.

Memory subsystem 820 represents the main memory of system 800, and provides storage for code to be executed by processor 810, or data values to be used in executing a routine. Memory subsystem 820 can include one or more varieties of random-access memory (RAM) such as DRAM, 3DXP (three-dimensional crosspoint), or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810, such as integrated onto the processor die or a system on a chip.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 800 includes interface 814, which can be coupled to interface 812. Interface 814 can be a lower speed interface than interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can exchange data with a remote device, which can include sending data stored in memory or receiving data to be stored in memory.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, NAND, 3DXP, or optical based disks, or a combination. Storage 884 holds code or instructions and data 886 in a persistent state (i.e., the value is retained despite interruption of power to system 800). Storage 884 can be generically considered to be a "memory," although memory 830 is typically the executing or operating memory to provide instructions to processor 810. Whereas storage 884 is non-volatile, memory 830 can include volatile memory (i.e., the value or state of the data is indeterminate if power is interrupted to system 800). In one example, storage subsystem 880 includes controller 882 to interface with storage 884. In one example controller 882 is a physical part of interface 814 or processor 810, or can include circuits or logic in both processor 810 and interface 814.

Power source 802 provides power to the components of system 800. More specifically, power source 802 typically interfaces to one or multiple power supplies 804 in system 800 to provide power to the components of system 800. In one example, power supply 804 includes an AC to DC (alternating current to direct current) adapter to plug into a wall outlet. Such AC power can be renewable energy (e.g., solar power) power source 802. In one example, power source 802 includes a DC power source, such as an external AC to DC converter. In one example, power source 802 or power supply 804 includes wireless charging hardware to charge via proximity to a charging field. In one example, power source 802 can include an internal battery or fuel cell source.

Figure 9:
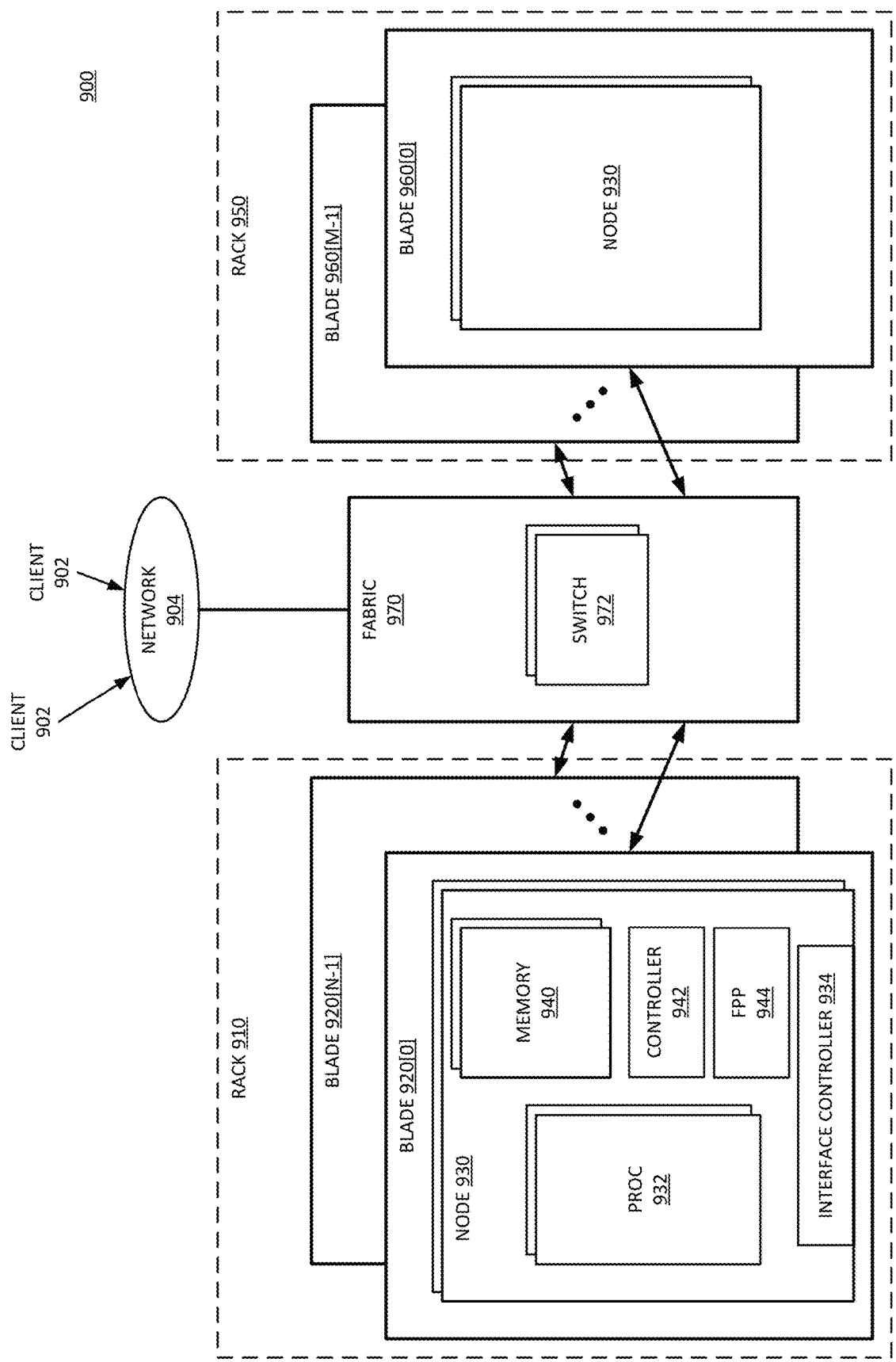
FIG. 9 is a block diagram of an example of a multi-node network in which faulty page prediction can be implemented.

FIG. 9 is a block diagram of an example of a multi-node network in which faulty page prediction can be implemented. In one example, system 900 represents a server farm. In one example, system 900 represents a data cloud or a processing cloud. Nodes 930 of system 900 represent a system in accordance with an example of system 100. Node 930 includes memory 940. Node 930 includes controller 942, which represents a memory controller to manage access to memory 940.

In one example, node 930 includes faulty page predictor (FPP) 944 or other error prediction engine to compute pages having a likelihood an uncorrectable error will occur. Faulty page predictor 944 can correlate correctable errors detected with hardware configuration to determine a likelihood an uncorrectable error will occur, and determine what pages are associated with the likely UE. Faulty page predictor 944 can provide an indication of faulty pages to a host operating system (not explicitly shown), which can then offline the pages. Faulty page predictor 944 can be on a system board of node 930. Faulty page predictor 944 can perform prediction in accordance with any example herein.

One or more clients 902 make requests over network 904 to system 900. Network 904 represents one or more local networks, or wide area networks, or a combination. Clients 902 can be human or machine clients, which generate requests for the execution of operations by system 900. System 900 executes applications or data computation tasks requested by clients 902.

In one example, system 900 includes one or more racks, which represent structural and interconnect resources to house and interconnect multiple computation nodes. In one example, rack 910 includes multiple nodes 930. In one example, rack 910 hosts multiple blade components 920. Hosting refers to providing power, structural or mechanical support, and interconnection. Blades 920 can refer to computing resources on printed circuit boards (PCBs), where a PCB houses the hardware components for one or more nodes 930. In one example, blades 920 do not include a chassis or housing or other "box" other than that provided by rack 910. In one example, blades 920 include housing with exposed connector to connect into rack 910. In one example, system 900 does not include rack 910, and each blade 920 includes a chassis or housing that can stack or otherwise reside in close proximity to other blades and allow interconnection of nodes 930.

System 900 includes fabric 970, which represents one or more interconnectors for nodes 930. In one example, fabric 970 includes multiple switches 972 or routers or other hardware to route signals among nodes 930. Additionally, fabric 970 can couple system 900 to network 904 for access by clients 902. In addition to routing equipment, fabric 970 can be considered to include the cables or ports or other hardware equipment to couple nodes 930 together. In one example, fabric 970 has one or more associated protocols to manage the routing of signals through system 900. In one example, the protocol or protocols is at least partly dependent on the hardware equipment used in system 900.

As illustrated, rack 910 includes N blades 920. In one example, in addition to rack 910, system 900 includes rack 950. As illustrated, rack 950 includes M blades 960. M is not necessarily the same as N; thus, it will be understood that various different hardware equipment components could be used, and coupled together into system 900 over fabric 970. Blades 960 can be the same or similar to blades 920. Nodes 930 can be any type of node and are not necessarily all the same type of node. System 900 is not limited to being homogenous, nor is it limited to not being homogenous.

For simplicity, only the node in blade 920[0] is illustrated in detail. However, other nodes in system 900 can be the same or similar. At least some nodes 930 are computation nodes, with processor (proc) 932 and memory 940. A computation node refers to a node with processing resources (e.g., one or more processors) that executes an operating system and can receive and process one or more tasks. In one example, at least some nodes 930 are server nodes with a server as processing resources represented by processor 932 and memory 940. A storage server refers to a node with more storage resources than a computation node, and rather than having processors for the execution of tasks, a storage server includes processing resources to manage access to the storage nodes within the storage server.

In one example, node 930 includes interface controller 934, which represents logic to control access by node 930 to fabric 970. The logic can include hardware resources to interconnect to the physical interconnection hardware. The logic can include software or firmware logic to manage the interconnection. In one example, interface controller 934 is or includes a host fabric interface, which can be a fabric interface in accordance with any example described herein.

Processor 932 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 940 can be or include memory devices and a memory controller.

In general with respect to the descriptions herein, in one example, an apparatus to predict memory failure, comprising: a substrate; and a controller disposed on the substrate, the controller to correlate a hardware configuration of a memory device with historical data indicating memory faults for specific elements of the hardware configuration, predict an uncorrectable error (UE) based on correlation of the hardware configuration with the historical data, and generate an estimate of pages for a host operating system (OS) to offline based on predicting the UE.

In one example of the apparatus, the controller is to predict the UE based on a pattern of correctable errors (CEs) detected in a row of memory. In accordance with any preceding example of the apparatus, in one example, the controller is to predict the UE based on a pattern of correctable errors (CEs) in a column of memory. In accordance with any preceding example of the apparatus, in one example, the controller is to predict the UE based on a pattern of correctable errors (CEs) in a bit of memory. In accordance with any preceding example of the apparatus, in one example, the controller is to generate the estimate of pages for the host OS to offline, including to predict physical pages of memory that will experience the UE based on a correlation of the physical pages to the hardware configuration. In accordance with any preceding example of the apparatus, in one example, the controller is to identify pages associated with a pattern of correctable errors (CEs) in the hardware configuration. In accordance with any preceding example of the apparatus, in one example, the controller is to generate the estimate of pages for the host OS to offline based on an error checking and correction (ECC) pattern to be applied for the memory device. In accordance with any preceding example of the apparatus, in one example, the controller is to determine whether a pattern of correctable errors (CEs) is fully correctable by the ECC pattern. In accordance with any preceding example of the apparatus, in one example, the substrate comprises a board of a dual inline memory module (DIMM), wherein the controller comprises a controller of the DIMM. In accordance with any preceding example of the apparatus, in one example, the substrate comprises a motherboard, wherein the controller comprises a controller on a motherboard. In accordance with any preceding example of the apparatus, in one example, the memory device comprises a memory module with multiple dynamic random access memory (DRAM) devices.

In general with respect to the descriptions herein, in one example, a system includes: a host hardware platform including a central processing unit (CPU) and a dual inline memory module (DIMM) having multiple memory devices, the CPU to execute an operating system (OS); and a controller coupled to the memory devices of the DIMM, the controller to correlate a hardware configuration of a memory device with historical data indicating memory faults for specific elements of the hardware configuration, predict an uncorrectable error (UE) based on correlation of the hardware configuration with the historical data, and generate an estimate of pages for a host operating system (OS) to offline based on predicting the UE.

In one example of the system, the controller is to generate one or more of: a row fault predictor based on a pattern of CEs detected in a row of memory, a column fault predictor based on a pattern of CEs detected in a column of memory, or a stuck bit indicator. In accordance with any preceding example of the system, in one example, the controller is to identify pages associated with a pattern of correctable errors (CEs) in the hardware configuration. In accordance with any preceding example of the system, in one example, the controller is to generate the estimate of pages for the host OS to offline based on an error checking and correction (ECC) pattern to be applied for the memory devices of the DIMM. In accordance with any preceding example of the system, in one example, the system includes one or more of: a display communicatively coupled to the CPU; a network interface communicatively coupled to a host processor; or a battery to power the system.

In general with respect to the descriptions herein, in one example, a method for predicting memory device failure includes: correlating a hardware configuration of a memory device with historical data indicating memory faults for specific elements of the hardware configuration; predicting an uncorrectable error (UE) based on correlation of the hardware configuration with the historical data; and generating an estimate of pages for a host operating system (OS) to offline based on predicting the UE.

In one example of the method, predicting the UE comprises correlating a hardware structure of the memory device with detected correctable errors (CEs), including correlating structure-specific fault indicators for the memory device. In accordance with any preceding example of the method, in one example, predicting the UE comprises generating a row fault predictor based on a pattern of CEs detected in a row of memory, or generating a column fault predictor based on a pattern of CEs detected in a column of memory, or generating a stuck bit indicator. In accordance with any preceding example of the method, in one example, generating the estimate of pages for the host OS to offline comprises identifying pages associated with a pattern of correctable errors (CEs). In accordance with any preceding example of the method, in one example, generating the estimate of pages for the host OS to offline comprises correlating errors with an error checking and correction (ECC) pattern to be applied for the memory device.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus to predict memory failure, comprising:
   a substrate;
   a nonvolatile memory disposed on the substrate; and
   a controller disposed on the substrate, the controller to correlate a hardware configuration of a memory device with historical data indicating memory faults for specific elements of the hardware configuration, predict an uncorrectable error (UE) based on correlation of the hardware configuration with the historical data including generating faulty component address (FCA) information, and generate an estimate of faulty page address (FPA) information to indicate pages for a host operating system (OS) to offline based on the FCA information, wherein the controller is to store the FCA information in the nonvolatile memory, to persist the FCA information between boots of the host OS, wherein the controller is to pass the FPA information to the host OS, including FPA information based on persisted FCA information.

2. The apparatus of claim 1, wherein the controller is to predict the UE based on a pattern of correctable errors (CEs) detected in a row of memory.

3. The apparatus of claim 1, wherein the controller is to predict the UE based on a pattern of correctable errors (CEs) in a column of memory.

4. The apparatus of claim 1, wherein the controller is to predict the UE based on a pattern of correctable errors (CEs) in a bit of memory.

5. The apparatus of claim 1, wherein the controller is to generate the estimate of pages for the host OS to offline, including to predict physical pages of memory that will experience the UE based on a correlation of the physical pages to the hardware configuration.

6. The apparatus of claim 5, wherein the controller is to identify pages associated with a pattern of correctable errors (CEs) in the hardware configuration.

7. The apparatus of claim 1, wherein the controller is to generate the estimate of pages for the host OS to offline based on an error checking and correction (ECC) pattern to be applied for the memory device.

8. The apparatus of claim 7, wherein the controller is to determine whether a pattern of correctable errors (CEs) is fully correctable by the ECC pattern.

9. The apparatus of claim 1, wherein the substrate comprises a board of a dual inline memory module (DIMM), wherein the controller comprises a controller of the DIMM, or wherein the substrate comprises a motherboard, wherein the controller comprises a controller on the motherboard.

10. The apparatus of claim 1, wherein the memory device comprises a memory module with multiple dynamic random access memory (DRAM) devices.

11. The apparatus of claim 1, wherein the controller is to conduct memory testing on hardware components predicted to be faulty, determine that the memory faults for a page of memory are no longer present, and notify the OS to reuse the page.

12. A system comprising:
a host hardware platform including a central processing unit (CPU) and a dual inline memory module (DIMM) having multiple memory devices, the CPU to execute an operating system (OS) and a nonvolatile memory; and
a controller coupled to the memory devices of the DIMM, the controller to correlate a hardware configuration of a memory device with historical data indicating memory faults for specific elements of the hardware configuration, predict an uncorrectable error (UE) based on correlation of the hardware configuration with the historical data including generating faulty component address (FCA) information, and generate an estimate of faulty page address (FPA) information to indicate pages for the OS to offline based on the FCA information, wherein the controller is to store the FCA information in the nonvolatile memory, to persist the FCA information between boots of the OS, wherein the controller is to pass the FPA information to the host OS, including FPA information based on persisted FCA information.

13. The system of claim 12, wherein the controller is to generate one or more of: a row fault predictor based on a pattern of CEs detected in a row of memory, a column fault predictor based on a pattern of CEs detected in a column of memory, or a stuck bit indicator.

14. The system of claim 12, wherein the controller is to identify pages associated with a pattern of correctable errors (CEs) in the hardware configuration.

15. The system of claim 12, wherein the controller is to generate the estimate of pages for the host OS to offline based on an error checking and correction (ECC) pattern to be applied for the memory devices of the DIMM.

16. The system of claim 12, further comprising one or more of:
a display communicatively coupled to the CPU;
a network interface communicatively coupled to a host processor; or
a battery to power the system.

17. A method for predicting memory device failure, comprising:
correlating a hardware configuration of a memory device with historical data indicating memory faults for specific elements of the hardware configuration;
predicting an uncorrectable error (UE) based on correlation of the hardware configuration with the historical data including generating faulty component address (FCA) information;
generating an estimate of faulty page address (FPA) information to indicate pages for a host operating system (OS) to offline based on the FCA information;
storing the FCA information in a nonvolatile memory, to persist the FCA information between boots of the host OS; and
passing the FPA information to the host OS, including FPA information based on persisted FCA information.

18. The method of claim 17, wherein predicting the UE comprises correlating a hardware structure of the memory device with detected correctable errors (CEs), including correlating structure-specific fault indicators for the memory device.

19. The method of claim 18, wherein predicting the UE comprises generating a row fault predictor based on a pattern of CEs detected in a row of memory, or generating a column fault predictor based on a pattern of CEs detected in a column of memory, or generating a stuck bit indicator.

20. The method of claim 17, wherein generating the estimate of pages for the host OS to offline comprises identifying pages associated with a pattern of correctable errors (CEs).

21. The method of claim 17, wherein generating the estimate of pages for the host OS to offline comprises correlating errors with an error checking and correction (ECC) pattern to be applied for the memory device.

* * * * *